US005143389A

United States Patent [19]

Jonkers

[11] Patent Number: 5,143,389

[45] Date of Patent: Sep. 1, 1992

[54] WHEELED SUPPORT FRAME FOR A REMOVABLE PLASTIC CONTAINER HAVING CLOSURE AND ACTUATING DEVICE

[75] Inventor: Godefridus H. J. Jonkers, Helmond, Netherlands

[73] Assignee: Wiva Verpakkingen B.V., Oosterhaut, Netherlands

[21] Appl. No.: 672,165

[22] Filed: Mar. 19, 1991

[30] Foreign Application Priority Data

Mar. 23, 1990 [NL] Netherlands ..................... 9000697

[51] Int. Cl.[5] ..................................... B62B 1/14

[52] U.S. Cl. ..................... 280/47.26; 280/47.24; 280/47.27; 280/79.5; 220/284; 220/300; 248/129

[58] Field of Search .............. 280/35, 47.131, 47.18, 280/47.23, 47.26, 47.27, 47.33, 79.5, 79.6, 47.24; 215/332; 220/284, 293, 295, 297, 300; 248/129, 147, 154

[56] References Cited

U.S. PATENT DOCUMENTS 664,555 12/1900 Jewett ..................... 248/154
1,444,125 2/1923 Kirkpatrick et al. ........ 248/129 X
1,837,411 12/1931 Cutter ..................... 248/154
2,079,698 5/1937 Roesinger .................. 248/147
2,405,674 8/1946 Schliwa et al. ............. 280/35 X
2,643,044 6/1953 Sundholm ................... 248/154 X
2,667,320 1/1954 Whitley .................... 248/147
3,811,597 5/1974 Frankenberg et al. ......... 220/284
3,830,514 8/1974 Green ...................... 248/129 X
4,333,580 6/1982 Sweigart, Jr. .............. 220/297 X
4,723,686 2/1988 Pennisi .................... 220/300

FOREIGN PATENT DOCUMENTS 0301467 11/1989 European Pat. Off. .
2819490 5/1979 Fed. Rep. of Germany ...... 220/284
1504747 12/1967 France ..................... 220/300
2627168 8/1989 France .

*Primary Examiner*—Andres Kashnikow
*Assistant Examiner*—Brian L. Johnson
*Attorney, Agent, or Firm*—Watson, Cole, Grindle & Watson

[57] ABSTRACT

A plastic container with a bottom and, connecting continuously onto the edge thereof a standing wall of random shape defining an upper circular edge portion on which can be placed a cover provided with a peripheral groove for receiving the edge portion, the cover and the edge portion being provided with co-acting locking elements. The locking elements include on the one hand by a number of L-shaped locking members distributed uniformly over the periphery, one leg being fixed to the cover or to the edge portion of the container such that it is oriented perpendicularly to the bottom, and on the other hand by an outward pointing lip on the edge portion or the cover and against which the other leg of the locking member can be placed. The cover can be lifted relative to the container during filling of the container, while for its permanent closure the cover is positioned on the upper circular edge of the container and turned through a determined distance relative to the container in order to place all the locking members simultaneously in contact with the co-acting lip, whereby the cover is locked onto the container.

16 Claims, 2 Drawing Sheets

WHEELED SUPPORT FRAME FOR A REMOVABLE PLASTIC CONTAINER HAVING CLOSURE AND ACTUATING DEVICE

BACKGROUND OF THE INVENTION

The invention relates to a plastic container with a bottom and connecting continuously onto the edge thereof, a standing wall of random shape, on the upper edge portion of which can be placed a cover, the cover and the edge portion being provided with co-acting locking means.

Such plastic containers are frequently used for receiving chemical waste which is to be burned together with the container. For this purpose it must, on the one hand, be possible for the user to remove the cover during filling of the container, while on the other, it must be locked during transport to the incineration location such that it cannot come loose.

SUMMARY OF THE INVENTION

The container according to the invention is distinguished in that the upper edge is circular and that the locking means are formed on the one hand by a number of L-shaped locking members distributed uniformly over the periphery, one leg thereof being fixed to the cover or the edge portion of the container such that it is oriented perpendicularly to the bottom, and on the other hand by an outward pointing lip on the edge portion or the cover against which the other leg of the locking member can be placed.

As a result of this embodiment the maneuverability of the cover is facilitated during filling of the container since it has only to be lifted up, while for its permanent closure the cover has to be turned through a determined distance relative to the container in order to place all the locking members simultaneously in contact with the co-acting lip, whereby the cover is locked onto the container.

In a preferred embodiment the cover is provided with a peripheral groove into which fits the edge portion of the container, the L-shaped locking members being arranged along the outer periphery of the cover groove.

It is further recommended to embody the container with an outward pointing flange provided with through-holes, the number of which is equal to the number of locking members, such that a part of the peripheral flange forms the lip-like locking part. The peripheral flange can include a recess for receiving a nose-like member on the L-shaped locking member.

In order to obtain a sealing closure, there is arranged in the peripheral groove of the cover a sealing means of resilient material against which the upper wall of the container comes to rest.

The invention further relates to a device for actuating the cover for a waste container as described above.

This device is characterized by a frame with support for supporting the container, a pressure element for co-action with the cover movable relative to the support, which pressure element is rotatable about an axis perpendicular to the support.

Using such a device, placing, fastening and, conversely, re-opening the cover on the container is facilitated since only a few operations are necessary for closing or opening the container.

These and other features of the invention will be further elucidated in the accompanying drawings.

DETAILED DESCRIPTION OF THE PREFERRED EMBODIMENT

Figure 1:
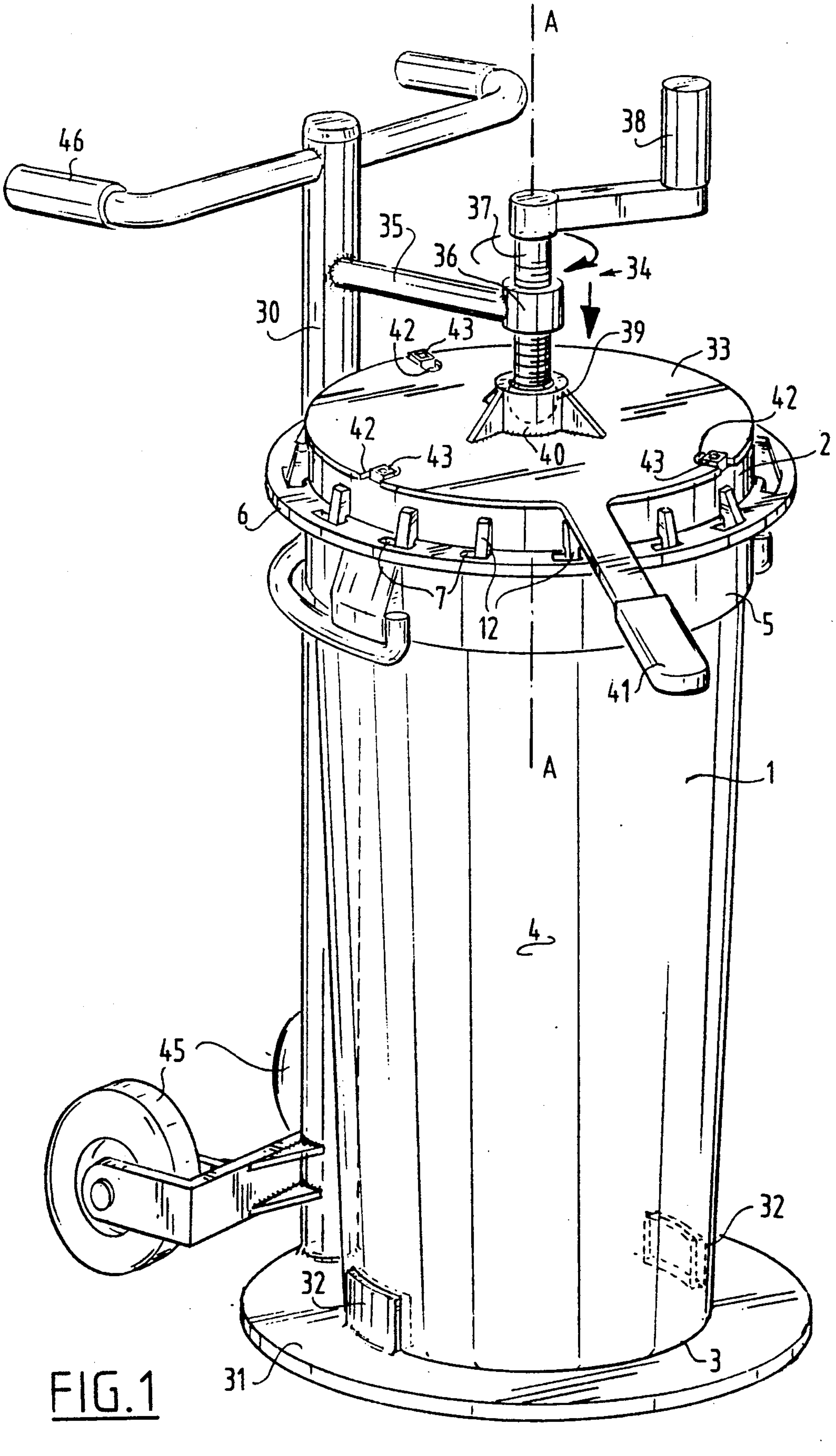
FIG. 1 shows a perspective side view of a container arranged in an actuating device according to the invention.

In the drawings the container according to the invention is designated with 1 and the cover with 2. The container has a bottom part 3 onto the edge of which connects the wall part 4, which is provided at the top with a circular edge 5. This latter is embodied inter alia with an outward pointing flange part 6, into which are recessed openings 7.

The cover 2 is dish-shaped and the upstanding outer edge thereof has on the underside an annular groove 8, in the bottom of which is arranged a sealing element of resilient material 9.

The edge part 5 of container 1 ends at the top in a zigzag-shaped edge strip 10, the top surface of which presses against the resilient material 9 when the cover is placed on the edge 5 of container 1.

Figure 2:
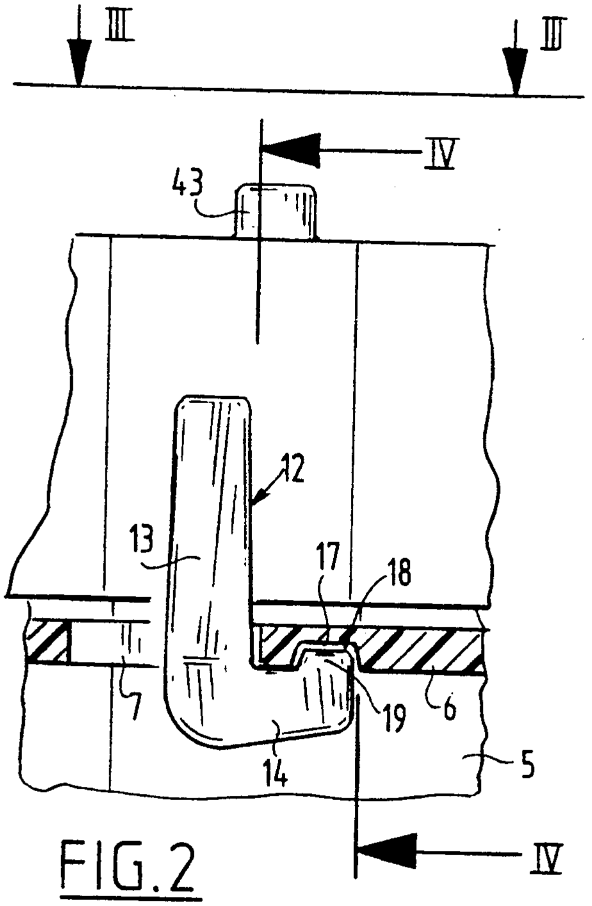
FIGS. 2, 3 and 4 show respectively a side view of a detail of the locking means, a top view along the line III—III in FIG. 2 and a standing section along the line IV—IV in FIG. 2.

The outer peripheral portion of cover 2 is provided at regular mutual intervals with a locking member 12 which in the embodiment shown is L-shaped (see FIG. 2). One leg 13 of the locking member points towards the bottom 3, while another leg 14 thereof has a length corresponding with the length of the through-hole 7 in the edge flange 6. This leg 14 co-acts with the bottom face of the edge flange 6, doing so along a limited lip-like portion 17 embodied on the underside with a recess 18. The leg 14 of the L-shaped locking member is embodied with a nose-like member 19 of a size such that it can fall into the recess 18, as shown in FIG. 2.

Figure 3:
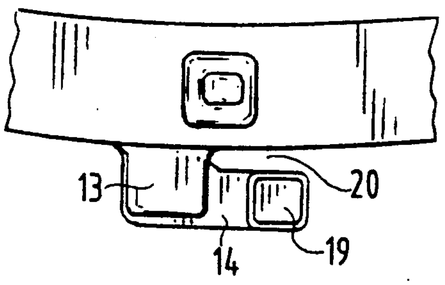
Figure 4:
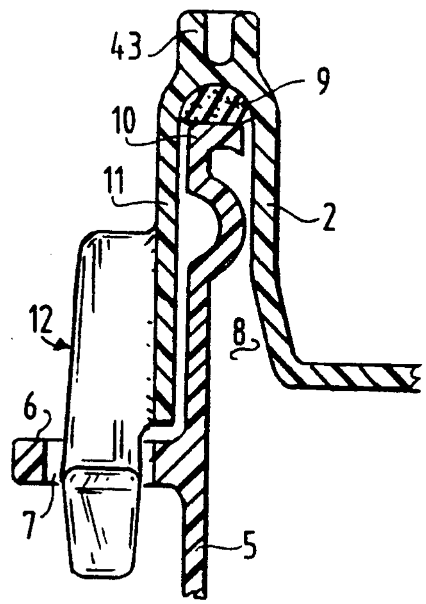

In FIG. 3 can be seen that the leg 14 is displaced slightly outward relative to the leg 13 in order to preserve a space 20 between the peripheral edge 11 of the cover 2 for the purpose of remaining free of the portion of the flange 6 lying adjacent to the edge strip 5 (see FIG. 4).

FIG. 1 shows that a large number of L-shaped locking members 12 are utilized, this number corresponding with the number of through-holes 7 in flange 6. Each L-shaped locking member 12 can thus be placed through an opening 7 of flange 6 and locking can be effected by turning the cover 2 relative to the container 1, since all legs 14 of the locking members 12 come to lie against the underside of flange 6, wherein all nose-like members 19 can fall into a corresponding recess 18, thus permanently locking the cover 2 onto container 1. The locking is brought about, inter alia, because the resilient material 9 is temporarily compressed and springs back again as soon as the nose-like member 19 falls into the recess 18. A permanent sealing of the container content is nonetheless ensured so that the container 1 with a cover 2 arranged thereon is secure for transport of chemical or toxic material stored in the container 1. The container with cover can be incinerated in the combustion furnace together with the contents thereof.

It will be apparent from the above that arranging the cover 2 on container 1 manually can be quite irksome on account of the large number of locking members 12 necessary for secure sealing.

For this purpose the invention proposes an actuating device, which is shown schematically in FIG. 1. This device consists of a frame 30 provided at the bottom with a supporting plate 31 whereon the bottom 3 of container 1 can be placed. The bottom plate 31 is embodied with stops 32 which prevent a turning of the container 1 relative to the supporting plate 31 and also localize the container in the correct position.

The frame 30 is further provided at an interval above the supporting plate 31 with a pressure member 33 in the form of a plate which can be moved in the direction towards and away from the support 31 with a moving mechanism 34 to be further designated below.

The moving mechanism 34 consists of a fixed arm 35 attached to frame 30, which arm ends in a screw eye 36. In the screw eye fits a threaded spindle 37 provided at the top end with a crank 38 which can be operated manually. The threaded spindle 37 is embodied on the other side with a ball hinge 39 which is close-fittingly accommodated in a ball holder 40 of the pressure member 33.

By moving the spindle 37 downward in the eye 36 with the crank 38 the cover 2 can be pressed uniformly onto the container 1. By a simple turning through a small angle the locking can then be effected according to the above described system.

In order to facilitate the turning, the plate-like pressure member 33 is embodied with a hand-grip 41 with which it is possible to turn the pressure member 33 round the spindle axis A-A standing perpendicularly of the supporting plate 31. The friction between the plate-like pressure member 33 and the cover 2 can transmit the turning onto the cover.

If this friction is not sufficient, the pressure member 33 can also be provided with recesses 42 into which fit stubs 43 forming an integral part of the upper rim of cover 2.

In the embodiment shown are depicted three stubs 43 with recesses 42. It will, however, be apparent that another number is also possible.

It should be noted for the sake of completeness that the frame 30 is embodied with travel wheels 45 in addition to a handle 46 for easy transport of the container to a place of collection or use.

A number of variants to the above-described embodiments are of course possible within the scope of the concept of the invention. It is particularly worth noting that the outward pointing flange 6 on the outside of container 1 can be replaced by a number of lips which corresponds with the number of locking members 12 and which are arranged on the outside of the container 1 in a manner similar to a flange 6.

I claim:

1. The combination of a plastic container, a cooperable cover and an actuating device for connecting or disconnecting the cover with respect to the container, said plastic container comprising a bottom having a peripheral edge and a wall which is connected continuously to the peripheral edge of said bottom and, with the bottom placed on a horizontal surface, extends upwardly therefrom, said wall defining a circular upper edge having an outwardly-extending lip; said cover defining a circular outer edge and including first engagement means and L-shaped locking means having first and second legs attached to said outer edge, said first leg extending downwardly when said cover is positioned on the upper edge of said container and said second leg being lockable against said outwardly-extending lip of said container when said cover is positioned on said container and rotated relative to said container; and said actuating device comprising a supporting plate on which the bottom of said container is adapted to be positioned, a frame member which extends away from said supporting plate, an arm which extends away from said frame member, and a pressure member which is movably attached to said arm so as to be capable of pressing said cover against said container when said container is positioned on said support plate, said pressure member including second engagement means for cooperation with said first engagement means of said cover when said pressure member is pressed against said cover, and handgrip means connected to said pressure member to facilitate manual rotation of said pressure member and consequently rotation of said cover relative to said container when said pressure member is pressed against said cover.

2. The combination according to claim 1, wherein said lip includes a recess and the second leg of said locking means includes a nose portion which fits into said recess.

3. The combination according to claim 1, wherein said lip comprises an annular flange having an opening for the first leg of the locking means.

4. The combination according to claim 1, wherein said first engagement means comprise stub protrusions on a top surface of said cover.

5. The combination according to claim 4, wherein said second engagement means of said pressure member includes recesses in which said stub protrusions are positioned.

6. The combination according to claim 1, wherein said cover includes a peripheral groove containing a resilient sealing material against which the upper edge of said container is positioned.

7. The combination according to claim 1, wherein said actuating device includes support wheels connected to said frame member.

8. The combination according to claim 1, wherein said actuating device includes a handle connected thereto.

9. The combination of a plastic container, a cooperable cover and an actuating device for connecting or disconnecting the cover with respect to the container, said plastic container comprising a bottom having a peripheral edge and a wall which is connected continuously to the peripheral edge of said bottom and, with the bottom placed on a horizontal surface, to extend upwardly therefrom, said wall defining a circular upper edge and including an L-shaped locking means having first and second legs attached to said upper edge, said first leg extending upwardly from said upper edge; said cover defining a circular outer edge and including first engagement means and an outwardly-extending lip against which said second leg of said container can be locked when said cover is positioned on said container and rotated relative to said container; and said actuating device comprising a supporting plate on which the bottom of said container is adapted to be positioned, a frame member which extends away from said supporting plate, an arm which extends away from said frame member, and a pressure member which is movably attached to said arm so as to be capable of pressing said cover against said container when said container is positioned on said support plate, said pressure member including second engagement means for cooperation with said first engagement means of said cover when said pressure member is pressed against said cover, and handgrip means connected to said pressure member to facilitate manual rotation of said pressure member and consequently rotation of said cover relative to said container when said pressure member is pressed against said cover.

10. The combination according to claim 9, wherein said lip includes a recess and the second leg of said locking means includes a nose portion which fits into said recess.

11. The combination according to claim 9, wherein said lip comprises an annular flange having an opening for the first leg of the locking means.

12. The combination according to claim 9, wherein said first engagement means comprise stub protrusions on a top surface of said cover.

13. The combination according to claim 12, wherein said second engagement means of said pressure member includes recesses in which said stub protrusions are positioned.

14. The combination to claim 9, wherein said cover includes a peripheral groove containing a resilient sealing material against which the upper edge of said container is positioned.

15. The combination according to claim 9, wherein said actuating device includes support wheels connected to said frame member.

16. The combination according to claim 9, wherein said actuating device includes a handle connected thereto.

* * * * *